April 21, 1959 W. D. GOODALE, JR., ET AL 2,883,463

TELEPHONE PAY STATION

Filed Dec. 31, 1956 3 Sheets-Sheet 1

INVENTORS W. D. GOODALE, JR.
W. PFERD

BY R. C. Lerry
ATTORNEY

INVENTORS W. D. GOODALE, JR.
W. PFERD
BY R. C. Perry
ATTORNEY

TELEPHONE PAY STATION

Filed Dec. 31, 1956 3 Sheets-Sheet 3

INVENTORS W. D. GOODALE, JR.
W. PFERD

BY R. C. Lerry

ATTORNEY

United States Patent Office 2,883,463

Patented Apr. 21, 1959

2,883,463

TELEPHONE PAY STATION

Walter D. Goodale, Jr., Chatham, and William Pferd, Berkeley Heights, N.J., assignors to Bell Telephone Laboratories, Incorporated, New York, N.Y., a corporation of New York Application December 31, 1956, Serial No. 631,894

16 Claims. (Cl. 179—6.3)

This invention relates to telephone pay stations and more particularly to telephone pay stations employing coin collector circuits.

The telephone industry is currently expanding and revising its facilities to provide more automatic handling of calls. The tendency throughout this revision process is to replace electromagnetic devices such as the relay by purely electronic equipment having the nature either of electronic tubes or, more recently, solid state devices such as transistors. Equipment of this nature due to its inherent characteristics, creates rather special requirements for the substation equipment which must operate in conjunction with it. Among these requirements is the need for a substation that operates upon relatively small amounts of current, inasmuch as electronic devices by their nature handle smaller currents and are capable of supplying smaller currents than those normally available when relays are employed. A further requirement stems from the fact that electronic circuits operate most effectively into matched loads, and yet another, that the load should most desirably be separated or isolated from ground. It may be noted here that isolation from ground gives rise to other advantageous features in telephone substations; these features including, freedom from the noise inherent in ground connections, greater ease in providing a balanced load, and in the case of pay stations, greater freedom from the possibility of fradulent customer use.

An object of the present invention is the provision of a telephone pay station operable in conjunction with electronic central offices.

Another object of the present invention is the provision of a telephone pay station which places a relatively small current drain upon the central office and which, in addition, is completely isolated from ground.

The elimination of ground as suggested, requires that the central office control the necessary substation operations over the line loop. In addition to the operations performed in connection with every substation, when a pay station is involved the central office must also control the deposit appraisal mechanism and the coin disposal mechanism. A survey of the prior art reveals that the deposit appraisal mechanism heretofore most prevalent was the mechanically struck gongs and chimes, although in some instances other devices were used that were rendered operative by the reversal of the loop battery. The coin disposal mechanism in the past has most frequently been controlled by the application of voltage between the tip conductor and ground. Here too, a reversal of battery was employed, voltage of one polarity being used to collect the coins and of the opposite polarity to refund them.

A further object of the present invention is the provision of a telephone pay station wherein all central office controlled operations are handled by signals applied between the ring and tip conductors of the line loop, and wherein such signals do not require any reversal of the loop battery.

The automatic operation which is the ultimate goal of the current trend, further requires that any signals used must be capable of interpretation by automatic equipment. Many of the deposit appraisal devices currently available do not furnish such signals and others provide signals which, although detectable, require rather complex equipment to perform the detection operation. In the first class are the well-known gongs and chimes, whereas in the second, various frequency signaling techniques may be found. Also to be considered in signaling is the possible simulation of the signals by unscrupulous parties and for that reason, the signals should be distinctive in quality. A further consideration in deposit appraisal signaling is the time when the signals are transmitted to the central office. It is advantageous when using automatic equipment to transmit these signals only upon central office demand, thereby permitting the most efficient utilization of all existing deposit interpreting equipment.

Another object of the present invention is the provision of a telephone pay station wherein the amount of money deposited for any call may be automatically verified by central office equipment upon demand.

A further object of the present invention is the provision in a telephone pay station of distinct, difficult-to-imitate, efficient deposit appraisal signals which will operate automatic equipment.

Of prime importance in all telephone pay stations is the control of the coin disposal mechanism. To insure a minimum of fraud, this control should not be in any way under customer control and it should not be possible for parties with fraudulent intentions to imitate the controlling signals, thereby gaining an advantage with respect to the amount required to make a phone call. Another aspect of coin disposal control is the ability of the central office to check following either collection or refund of a deposit to insure that such an operation has taken place.

A still further object of the present invention is the provision of a telephone pay station wherein the control of the coin disposal mechanism is at the discretion of the central office and is not susceptible of fraudulent imitation by unscrupulous parties.

A basic result of employing an ungrounded telephone pay station is that all control operations originating from the central office must be performed over the line loop. The three control operations encountered in pay stations in addition to those necessary for regular subscriber stations will be henceforth referred to as deposit control operations and as mentioned previously, include deposit collection, deposit refund, and deposit appraisal.

Considering first the coin disposal operations as performed in present day grounded telephone pay stations, it will be found that the coin disposal mechanism resides in a circuit located between the tip conductor and ground. According to the well-known procedure, the coin disposal mechanism is operated to collect deposited coins by applying a direct-current potential of one polarity and it is operated to refund deposited coins by applying a direct-current potential of the opposite polarity.

The task of deposit appraisal or deposit signaling is currently performed using gongs and chimes, each deposited coin of a given denomination striking a particular gong or chime and the vibration resulting therefrom being interpreted by an operator at the central office who thereby ascertains the amount of money deposited. Other techniques which have been developed in response to the need for a deposit signaling means interpretable by automatic equipment have been connected across the transmitting and receiving equipment at the pay station and are operable upon reception of a signal from the central office. This signal most frequently has been a reversal of the loop potential and served the further purpose of energizing the signaling equipment.

It is apparent that to perform the deposit control operations, three distinct signals are necessary, and when an ungrounded loop is used, the prior technique of battery reversal is capable of furnishing only one signal. By utilizing a local source of power, it is possible by transmitting three distinct signals from the central office, which indicate the manner in which the local source of power is to be connected, to simply and efficiently perform the operations desired. It may be noted that due to the increasing advances in the battery art, which provide more efficient operation and more convenient packaging of batteries, the utilization of such batteries in telephone pay stations is more practical today than it has been.

A feature of the present invention relates to the provision in a telephone pay station of selecting means operated by signals from the central office which control the collection or refund of deposit and the deposit appraisal means.

Certain characteristics that have been encountered when battery reversal is employed as part of the deposit control operations are circumvented by the present invention through the provision of deposit control circuitry operable with normal line polarity. This invention provise deposit control means bridged across the line loop and yet effectively isolated therefrom during normal operation. The provision of such isolation is necessary in order to prevent customer interference with deposit control operations and at the same time to avoid disturbing the customer by crackling or other noises in the handset during deposit control. In addition to this, the provision of central office equipment is simplified when the deposit control circuitry bridged across the line exhibits a high impedance, as it does herein, in that it does not materially affect the total impedance presented to the central office by the pay station, and therefore, the load presented will be constant and similar to that which would be encountered on other subscriber lines.

Another feature of the present invention relates to the provision of deposit control means bridging the transmitting and receiving equipment which is unaffected by normal conversation and the operation of which may not be initiated over the customer transmitter.

This invention specifically discloses two illustrative embodiments which provide the advantages mentioned above and will work efficiently with automatic equipment. These embodiments differ in the type of signals employed for the initiation of the deposit control operations. In one embodiment the signals are merely a series of pulses, the number of which indicates the operation to be performed, and in the other they are composed of alternating-current signals, the particular frequency components present in the signals indicating the operation to be performed.

It is well known that a direct current pulse is a relatively easy signal to produce and that it is also a signal quite easy to detect. In order to construct distinct signals using such pulses as the basic component, it is only necessary to use a series of pulses. Thus, one pulse will indicate that one operation should be performed, two pulses will indicate that another operation should be performed, etc. By using such a signaling technique, one embodiment of the present invention controls a stepping or selecting means which in response to pulses from the central office selectively connects a local power supply to the coin disposal mechanism or the deposit appraisal means.

Accordingly, a feature of the present invention relates to the provision in a telephone pay station of means bridged across the line loop which is activated by a pulse or a plurality of pulses from the central office to control the operation of the coin disposal mechanism or the deposit appraisal means.

In another embodiment of the invention, consideration is given to the fact that telephone equipment has been designed to operate most effectively within a particular range of frequencies. Realizing this, it is advantageous to utilize this band of frequencies to transmit the deposit control signals. A detrimental factor lies in such signaling, however, in that customer may possibly orally imitate a signal which lies within the audio band, thereby disrupting deposit control. By mixing several frequencies, however, an operation easily performed by automatic equipment, this fraudulent practice can be avoided and the mixed frequencies can be separated at the pay station by special detection circuits. The particular frequencies present in the composite signal following detection may then be selectively employed to operate relays or similar equipment for actuating the coin disposal mechanism and the deposit appraisal means.

A further feature of the present invention relates to the provision in a telephone pay station of means for detecting several frequencies of a plurality of frequencies transmitted by the central office.

Another feature of the present invention as disclosed in a specific embodiment thereof, relates to the provision of means in a telephone pay station for selectively operating deposit control equipment only when a predetermined number of frequency components are present in the central office control signal and preventing operation of the equipment when either more or less of these components are present.

From another aspect, the present invention relates to the provision in a telephone pay station of a plurality of individual relay means associated with the coin disposal mechanism and deposit signaling means and operated via detection circuitry from the central office by frequency signals.

The problems of signaling also come up in relation to transmitting the deposit information to the central office, and it will be understood that many of the same factors hereinbefore discussed are again applicable. By utilizing a coin totalizing mechanism in conjunction with a substation relay which opens the line loop a number of times representative of the amount deposited, it is possible to transmit a series of break pulses to the central office which may then be easily detected and interpreted by automatic equipment.

Another feature of the present invention relates to the provision in a telephone pay station of a totalizer and relay combination arranged to break the loop circuit a number of times representative of the amount deposited.

In conjunction with the last-mentioned feature, this invention provides several circuit means designed to prevent any imitation by a customer of the deposit appraisal signaling loop breaks. This is essential because the dial pulsing contacts are capable of transmitting similar signals and because proper manipulation of switchhook contacts would also transmit similar signals.

The present invention, therefore, by utilizing a circuit shunting the transmitting and receiving equipment, which circuit is responsive to distinct signals from the central office to cause operation of either the coin disposal mechanism or the deposit appraisal mechanism, provides a novel and efficient telephone pay station which may be operated in conjunction with electronic central offices.

The foregoing, as well as additional objects and features of the present invention, will be more clearly understood and appreciated from the following description to be considered in connection with the accompanying drawings wherein.

Figure 4:
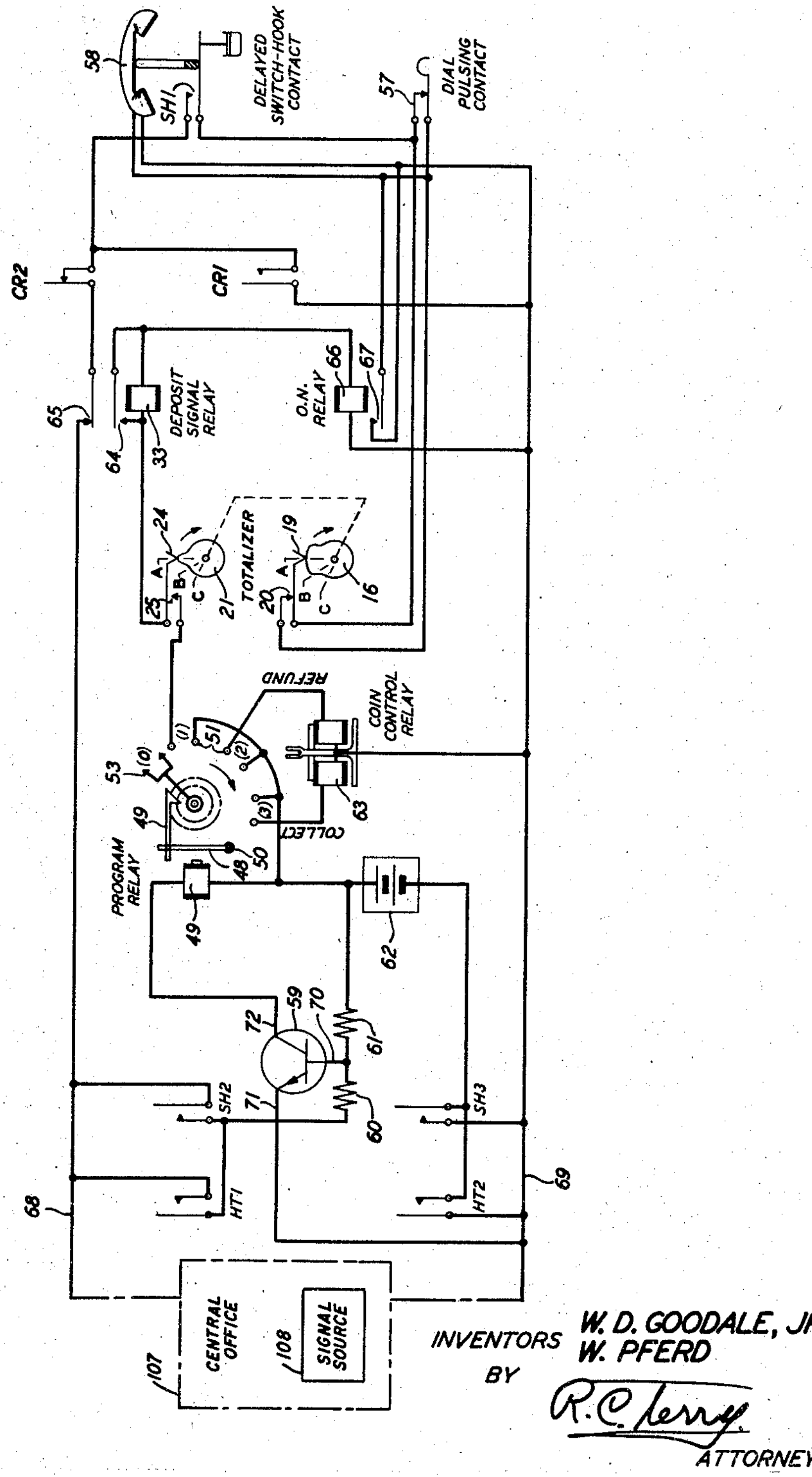
Figure 5:
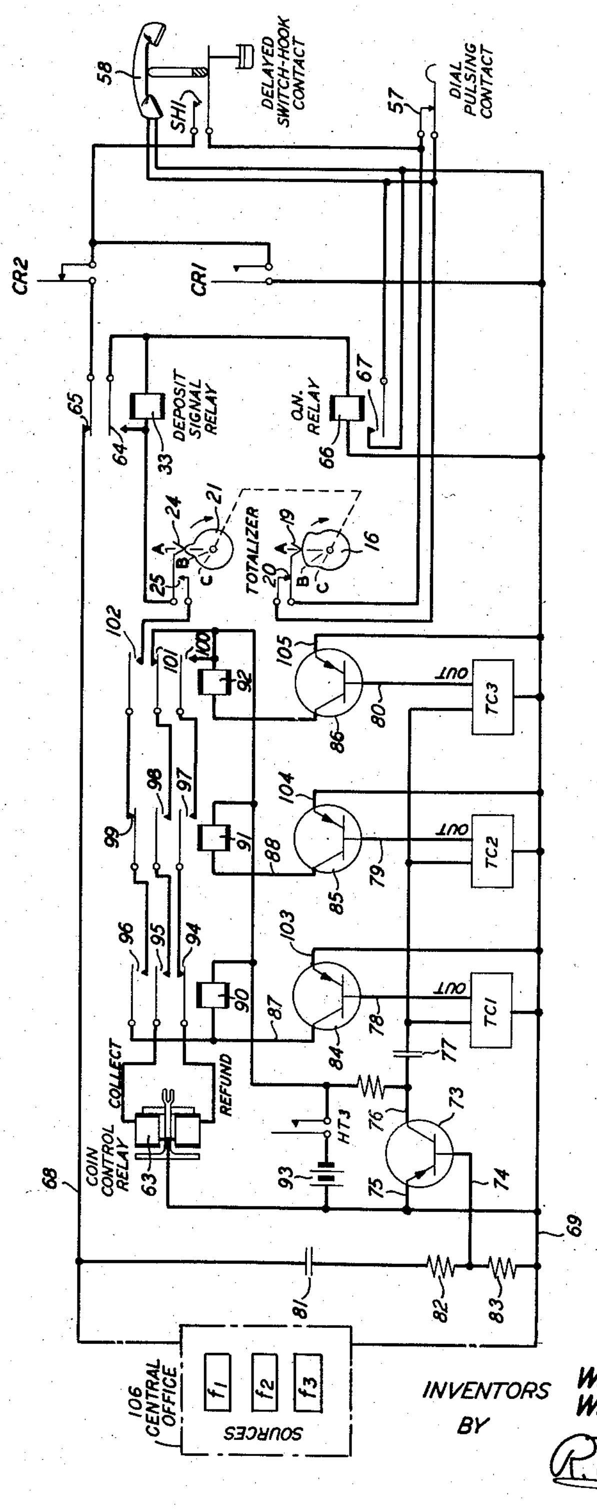

Fig. 4 shows a circuit schematic of a telephone pay station employing an illustrative embodiment of the invention wherein the deposit control operations to be performed are selected by pulses transmitted from the central office to the pay station; and Fig. 5 shows a circuit schematic of a telephone pay station employing an illustrative embodiment of the invention wherein the deposit control operations to be performed are selected by alternating-current signals transmitted from the central office to the pay station.

Figure 1:
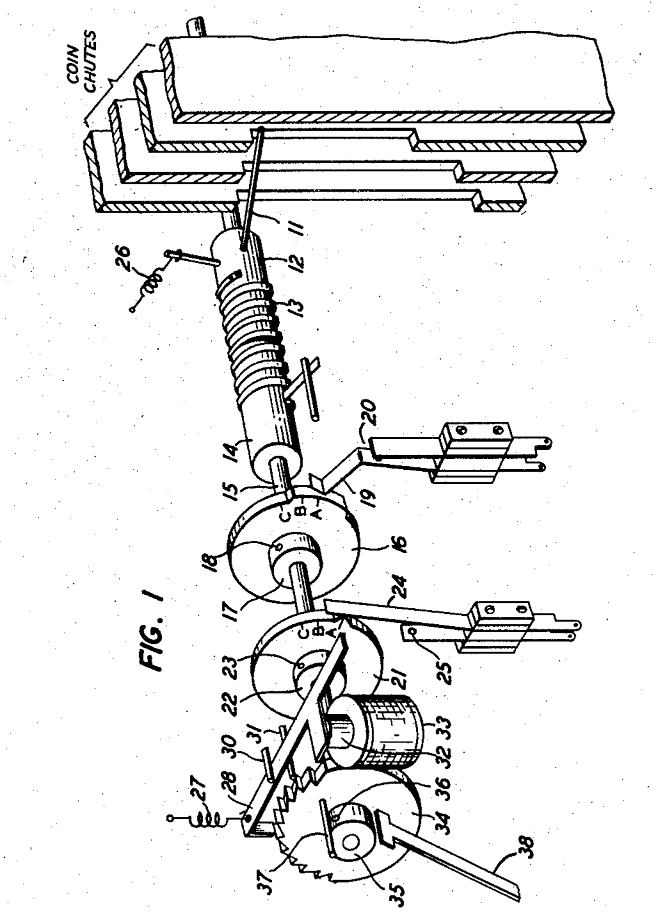
Fig. 1 is a perspective view of the coin totalizing mechanism and associated control devices employed in this invention for fraud prevention and deposit signaling.

Referring to the drawings, several illustrative embodiments of the present invention are disclosed. The circuit schematics of these embodiments constitute Figs. 4 and 5. It will be seen that each of these circuits employs the coin totalizing device depicted in Fig. 1 in order to control the transmission of deposit appraisal signals and in order to prevent use of the pay station until an initial amount has been deposited. A totalizing mechanism with the associated control devices as shown in Fig. 1 is the subject of a co-pending patent application of W. D. Goodale, Jr., and W. Pferd, Serial No. 591,116, filed June 13, 1956. The mechanism of Fig. 2 which is employed in the circuit of Fig. 4 also finds its counterpart in the aforementioned application.

Figure 2:
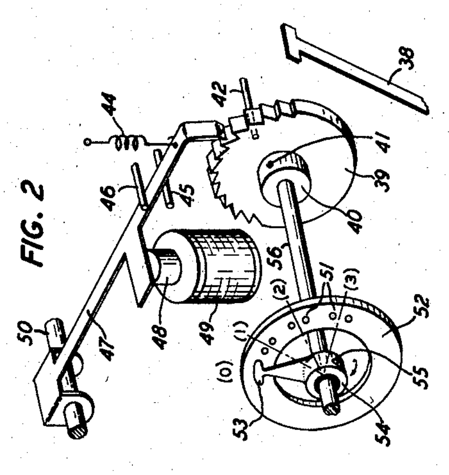
Fig. 2 is a perspective view of a mechanism used in conjunction with Fig. 1 for the selection of the deposit control operations in a specific illustrative embodiment of the invention.

In order to conveniently describe the present invention, a brief description of the operation of the mechanisms of Figs. 1 and 2 is given hereinafter. A more complete discussion of these operations may be had by reference to the aforementioned application.

Figure 3:
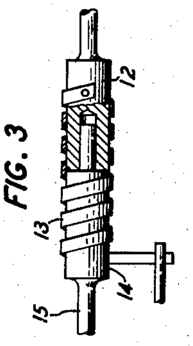
Fig. 3 is a view of a coin totalizer band clutch mechanism which facilitates totalization of deposited coins.

The totalizing mechanism operates upon a band clutch principle. As shown in Fig. 3, the band clutch is composed of three basic parts; a driving cylinder 12, a driven cylinder 14, and a spring 13 fastened to cylinder 12 and encircling both cylinders in such a manner that rotation of driving cylinder 12 tends either to tighten or loosen the coupling between the spring and the cylinders. Considering the functioning of this clutch when incorporated in the totalizing mechanism, when a coin is deposited in the coin chutes of Fig. 1 its travel through the chute associated with the particular denomination of coin will bring it in contact with coin finger 11. The coin chutes are physically arranged to impart a given degree of rotation to this coin finger for each particular denomination of coin deposited. For example, deposit of a five-cent coin may rotate the coin finger A degrees. Deposit of a ten-cent coin may rotate the coin finger 2A degrees, and deposit of a twenty-five cent coin may rotate the coin finger 5A degrees. As coins are deposited and coin finger 11 is rotated, driving cylinder 12, which is secured to coin finger 11, is similarly rotated. This causes spring 13 to tighten about both cylinders and therefore, due to the friction coupling between spring 13 and driven cylinder 14, cylinder 14 also rotates. When the coin has passed the coin finger 11 descending further down the chute, driving cylinder 12 is returned to its original position under the action of spring 26. This return, however, has no effect upon the rotated position of cylinder 14 because this returning rotation is in a direction tending to loosen spring 13 and therefore the friction coupling between spring 13 and cylinder 14 is insufficient to alter its position. Hence, in Fig. 1 as coins are deposited, driven cylinder 14 is rotated in a clockwise direction so that the number of degrees in its rotated position is always proportional to the total value of the coins deposited. Shaft 15 may be a turned down portion of cylinder 14 or may be a separate member rigidly secured thereto so that it is also rotated a number of degrees proportional to the amount of money deposited. Adjustably mounted on shaft 15 are two contact controlling cams 16 and 21. These cams are provided with shoulders 17 and 22, respectively, to accommodate set screws 18 and 23 respectively. Adjustment of these set screws will permit the rotational adjustment of these two cams in relation to shaft 15. This adjustment provides a means of changing the amount of deposit necessary to activate the contacts controlled by these cams. Spring followers 19 and 24 which control contacts 20 and 25 respectively are individually acted upon by these cams. The deposit of coins and the consequent rotation of cams 16 and 21 result upon deposit of predetermined amounts in the opening of contacts 20 or the closing of contacts 25.

In Figs. 1, 4, and 5, the letters A, B, and C associated with the cams 16 and 21 are indicative of the position of followers 19 and 24 upon their particular cam surfaces following the deposit of predetermined amounts. Throughout the following description, position A will represent no-deposit, position B will represent the minimum deposit, and position C will represent the initial charge deposit. Examination of Fig. 1 will therefore make it clear that when the minimum deposit has been made, contacts 25 will be closed and will continue so regardless of how much additional deposit is made, and furthermore, it will be clear that deposit of the initial charge will result in the opening of contacts 20, these contacts remaining open regardless of how much additional deposit is made.

On the left-hand end of shaft 15, as illustrated in Fig. 1, a reset mechanism is mounted. This reset mechanism is designed to operate in either of two fashions and has been described in the aforementioned application of Messrs. Goodale and Pferd. Considering the first of these reset procedures, the elements employed comprise toothed disc 34 secured to shaft 15 by set screw 36 mounted on shoulder 35, and electromagnet 33 with associated armature 32 which acts upon pawl 28 in a manner which brings it into contact wtih the teeth on toothed wheel 34 every time electromagnet 33 is activated. Stop 31 prevents pawl 28 from descending too far into toothed wheel 34, while stop 30 maintains pawl 28, acted upon by spring 27, in a position poised over toothed wheel 34 yet not in contact therewith. Every downward stroke of pawl 28 causes a counterclockwise rotation of toothed wheel 34 a number of degrees proportional to the minimum amount of deposit. Therefore, assuming the minimum amount of deposit to be five cents, in the event that thirty cents was deposited, operation of electromagnet 33 six times, attended by the downward motion of pawl 28, would result in six steps of toothed wheel 34. This will reset the totalizer and its associated control elements to a no-deposit position.

The second reset procedure makes use of member 37 which perpendicularly projects from the side of toothed wheel 34, and member 38 which is the extension of the armature of a coin control relay. Coin control relays having an armature and vane arrangement are well known in the art and are utilized to collect and refund deposited coins. The extension of such an armature which comprises member 38 may be so oriented that the operation of the coin control relay to either refund or collect a deposit will cause member 38 to bear against member 37 forcing it to the left, thereby rotating toothed wheel 34 and hence the entire totalizer in a counterclockwise direction which of course performs the reset operation. Member 38 may be restricted in any suitable manner from moving beyond that position which results in the reset of the totalizer and its elements to the no-deposit position. The entire device as depicted in Fig. 1 may be employed in the illustrative embodiment of this invention shown in Fig. 5.

Fig. 2 is a selecting mechanism used in conjunction with the device of Fig. 1 to provide an operative structure for the circuit in Fig. 4. A toothed wheel 39 secured to shaft 56 by a set screw 41 through shoulder 40, similar to toothed wheel 34 hereinbefore discussed, is employed to translate the operations of electromagnet 49 into switch positions. Each time electromagnet 49 operates, armature 48 causes pawl 47 to descend toward toothed wheel 39 until stopped by stop 45, and each time pawl 47 descends it makes contact with the teeth below it causing toothed wheel 39 to rotate in a clockwise direction. This rotation is imparted to shaft 56 upon the left-hand of which a shorting device 53 is mounted by the usual set screw 55 through shoulder 54. This shorting device may consist of any conductive material. Every descending motion of pawl 47 will result in a rotation of shorting device 53 to place it in position over a different pair of contacts 51. Therefore, each energization of magnet 49 is followed by a shorting of two different and distinct contacts. Four positions are provided for and are labeled (0), (1), (2), and (3) in the figure.

The selecting mechanism of Fig. 2 is reset by armature extension 38 every time the coin relay is operated. Considering Figs. 1 and 2 jointly, it is seen that whenever armature extension 38 moves to reset the totalizing mechanism it simultaneously will reset the selecting mechanism of Fig. 2 by bearing against member 42. It should be understood however, that the structure obtained by combining Figs. 1 and 2 is employed only for the circuit shown in Fig. 4, and that the circuit shown in Fig. 5 only requires the employment of the structure depicted in Fig. 1.

Before commencing with a description of the illustrative embodiments of this invention, one more structural feature is worthy of note. Located at the bottom of the coin chutes and an integral part of many well-known coin relays is a hopper trigger. This trigger is merely a finger projecting into the coin chutes which is deflected or tripped when the first coin is deposited. When deflected, the hopper trigger may close contacts such as those which will be discussed in connection with the illustrative embodiment schematics. These contacts remain closed until the coin relay is operated to either refund or collect the deposit, at which time the hopper trigger is reset and they immediately reopen.

Considering Fig. 4 specifically, it will be noted that it includes the two cams shown in Fig. 1. Cam 16, which acts upon follower 19, controls the opening of contacts 20 and thereby serves as a means of shorting out the dial pulsing contacts 57 until a predetermined amount of deposit is made. Cam 21 acts upon follower 24 thereby permitting contacts 25 to close as soon as initial deposit is made. Fig. 4 also contains a schematic representation of the mechanism displayed in Fig. 2, similar parts being labeled by similar numbers. In the upper right-hand portion of Fig. 4, handset 58 appears and, as shown, removal of this handset operates to permit closure of switchhook contact SH1. In addition to controlling SH1, removal of the handset also operates to close switchhook contacts SH2 and SH3 which for simplicity of drawing and ease of understanding are located on the left-hand side of the figure. Shunting each of the last two mentioned switchhook contacts are hopper trigger contacts HT1 and HT2 respectively. Other elements in the drawing are a transistor 59 connected at its base 70 to resistors 60 and 61, direct-current voltage source 62 utilized as the supply for all deposit control operations, coin relay 63 with a pair of contacts CR1 and CR2 located in the drawing for simplicity near handset 58, deposit signal relay 33 with which is associated contacts 64 and 65 designed to close and open respectively with energization of deposit signal relay 33, and off-normal relay 66 which is energized during deposit signaling to short out handset 58 via contacts 67. Hopper trigger contacts HT1 and HT2 are closed as described above upon the deposit of the first coin, to be reopened only by operation of coin relay 63. As mentioned above, this coin relay may be any of the well-known types containing an armature and vane arrangement for coin disposal. This relay contains two separate coils and is operable to collect the deposit when a direct-current voltage is applied to one coil and to refund the deposit when a direct-current voltage is applied to the other coil. Contacts CR1 and CR2 are used to provide the central office with a positive indication whenever the coin relay is operated. Operation of the coin relay, as well as controlling the deposited coins, causes CR2 to open and CR1 to close. Two distinct operations are thereby performed. The opening of CR2 transmits a break signal to the central office indicating operation of the relay and the closing of CR1 by-passes SH1 and dial pulsing contacts 57 thereby preventing customer simulation of this break pulse. The central office 107 is diagrammatically represented as containing a signal source 108. This source may be developed by any well-known means, and comprises the characteristics hereinafter recited.

In order to properly consider the operation of the circuit shown in Fig. 4, let it be assumed that the initial rate charge to obtain central office recognition is ten cents and that the charge for a local call is the same. Also, let us assume that the additional deposit necessary to continue a local call into overtime is five cents. Deposit of a five-cent coin will therefore rotate the totalizer to position B and deposit of two five-cent coins or one ten-cent coin will rotate it to position C.

To initiate a call, the customer removes handset 58 from its cradle thereby closing all switchhook contacts. It may here be noted that switchhook contact SH1 is delayed in closing by any suitable means in order to deter fraudulent parties from operating the switchhook in simulation of either dial operation or coin relay operation. When SH1 closes, a complete loop is recognized by the central office. This loop is composed of conductor 68, contacts 65, CR2, SH1, dial pulsing contacts 57 in parallel with contacts 20, handset 58, and conductor 69. Detecting this condition, the central office will apply a dial pulse receiving circuit. However, the customer is unable to dial the directory number of the party he wishes to contact because the dial pulsing contacts 57 are shorted out by contacts 20.

By depositing the initial charge, the control cams will be rotated to position C and a customer may then proceed with the call. If two five-cent coins are used, the first will rotate the totalizer to position B and as it proceeds down its chute will operate the hopper trigger closing contacts HT1 and HT2 and the second will rotate the totalizer to position C. In this position, cam 16 permits the opening of contacts 20 thereby unshorting dial pulsing contacts 57 and enabling the customer to transmit the dial pulses to the central office which represent the directory number of the party with whom a connection is desired.

Upon receipt of the dial pulses, the central office investigates them to determine the class of the call, that is, whether it be a local call, a multi-unit call, or a toll call.

It may be noted that a local call requires the deposit of an initial or minimum rate and enables the customer after deposit of the initial rate to complete a call to any subscriber within the local area by dialing the called party's directory number. Multi-unit calls are those calls requiring additional amounts of deposit and enable the customer after such deposit to complete a call to any subscriber within the area encompassed by the rate deposited by dialing the called party's directory number. Toll calls, as presently handled, require operator assistance to establish connection with the called party as well as to supervise the deposit and cover all areas outside of those served by multi-unit calls.

If the call is of a local nature, upon central office investigation of the directory number connection with the called party will be established and conversation may ensue over the line loop. For purposes of discussion, the period of time allotted for a local call will be taken as five minutes, after which overtime periods of any time duration may be established as determined by the rate structure in any particular area. When conversation has continued for approximately four and one-half minutes; therefore, the central office in order to collect the deposited coins will transmit three break pulses.

These pulses will find two parallel paths available to them at the pay station. The first is the path over which conversation has been taking place and comprises conductor 68, contacts 65, CR2, SH1, 57, handset 58, and conductor 69. The second circuit encountered by the pulses is the deposit control circuit and will be seen to comprise conductor 68, contacts HT1 and SH2 in parallel, resistor 60, base 70 of transistor 59, emitter 71 of transistor 59, and conductor 69. As a result of the high impedance of resistors 60 and 61 in series, only a minimal amount of the pulse energy is consumed through resistor 61, battery 62, and contacts HT2 and SH3 in parallel. Transistor 59, being energized by source 62, amplifies the pulse providing a pulse of sufficient amplitude from its collector 72 to energize relay 49 each time a single pulse appears. Thus, program relay 49 is energized three times and this energization, as discussed hereinbefore with respect to Fig. 2, causes shorting conductor 53 to step around to position (3). Further consideration of the figure shows clearly that in this position a circuit is established which contains source 62, contacts (3), the collect winding of coin relay 63, conductor 69, and contacts HT2 and SH3 in parallel. The coin relay coil energized by this connection causes a collection of the deposited coins.

Concurrently with the operation of coin relay 63, contacts CR2 open, disconnecting the transmitting and receiving portion of the circuitry comprising handset 58, SH1, and dial pulsing contacts 57, and contacts CR1 close, providing double protection by shorting out the transmitting and receiving circuitry. The operation of these CR contacts insures that no customer intervention will occur during the deposit control operation and at the same time provides a break pulse which indicates to the central office the operation of coin relay 63. The entire operation entails the use of only a minor portion of one second and therefore causes only an insignificant disturbance of the conversation. An additional operation performed upon energization of the coin relay is the resetting of shorting conductor 53 to (0) and the reopening of hopper trigger contacts HT1 and HT2.

After five minutes, the central office transmits a single pulse which encounters the same circuitry as was hereinbefore recited in connection with the triple pulse signal. This time, however, the hopper trigger contacts HT1 and HT2 are open and therefore the deposit control circuit comprises contact SH2, resistor 60, base 70 of transistor 59, and emitter 71 of transistor 59. Amplification of this pulse by transistor 59 provides one energizing pulse for program relay 49, thereby stepping shorting conductor 53 to position (1). Source 62 is thereby connected through contacts (1) to contacts 25 which, since no additional deposit has been made, are open. Consequently, the deposit signal relay 33 is not activated and the central office is therefore aware that no additional deposit has been made subsequent to the collection of the initial deposit and will disconnect the parties.

If, as is frequently the case, the calling customer wishes to continue his conversation into overtime, upon hearing collection of the deposit at the four and one-half minute time the customer should deposit an additional amount. In the event that this does happen, when five minutes have elapsed and the single pulse is applied from the central office causing shorting conductor 53 to close contacts (1), source 62 will again be connected via contacts (1) to contacts 25. This time, however, these contacts are closed as a result of rotation of the totalizer and therefore a circuit is establihed. Included in this circuit are source 62, contacts (1), contacts 25, deposit signal relay 33, off-normal relay 66, conductor 69, and contacts HT2 and SH3 in parallel. Connection of this circuit results in energization of both deposit signal relay 33 and off-normal relay 66. As discussed above in connection with Fig. 1, each operation of relay 33 results in resetting the totalizing mechanism one unit of deposit back toward the no-deposit position. Consideration of the circuit will make it obvious that the deposit signal relay 33 is connected in a self-stepping fashion, the stepping action being performed by having contact 64 close, shorting the relay windings, every time the relay is energized, thereby causing it to momentarily deenergize and permit contacts 64 to reopen. Operating concurrently with the stepping action, contacts 65 open and close and such operation will transmit a break pulse to the central office for each step. In this way, the central office is apprised of the number of steps taken by deposit signal relay 33 and hence the number of units of deposit which have been made. When the totalizing mechanism is reset to the no-deposit position, contacts 25 are reopened, disconnecting battery 62 from the circuit and permanently deenergizing relay 33. During the entire period that battery 62 is connected, off-normal relay 66 is energized and therefore contacts 67 are closed. The closure of these contacts provides a direct short across the handset 58, which contacts both the transmitting and receiving elements of the telephone, and therefore the telephone subscriber neither hears the deposit signaling operation nor is able to interfere with it orally. Being satisfied with the amount deposited, the central office may permit the call to continue for the overtime period or for the period which has been paid for by the deposit. Following expiration of the overtime period paid for, the above procedure is repeated resulting in either disconnection if additional deposit has not been made or in a further extension of time, in the event that deposit has been made.

The customer may hang up the handset either before or after an amount of money has been deposited. If he hangs up before collection, the opening of switchhook contact SH1 indicates this to the central office and in response, three pulses are transmitted by it. These pulses activate the deposit control circuitry through a circuit composed of conductor 68, HT1, resistor 60, base 70, emitter 71, and conductor 69. These pulses are amplified and appear at collector 72 with sufficient energy to operate program relay 49 three times, causing shorting conductor 53 to close contacts (3). The resulting circuit, which includes coin relay 63 is designed to collect the deposited coins. If hang up should occur following collection of the deposit, for instance in the period between four and one-half minutes and five minutes, the central office will be informed of the hang up by the opening of switchhook contact SH1 and will transmit the series of three pulses for collection. In this case, however, the program relay will not be operated because both the hopper trigger contacts HT1 and HT2 and the switchhook contacts SH2 and SH3 are open disconnecting the deposit control circuit. Should hang up occur before the called party answers, the central office is again apprised of the condition by the opening of switchhook contact SH1; however, in this instance two pulses will be transmitted to the pay station, these pulses following the aforementioned path through the deposit control circuitry will result in operation of program relay 49 two times, causing shorting conductor 53 to close contacts (2). When these contacts are closed, the coin relay is connected to refund the deposited coins. The circuit involved in this connection includes source 62, contacts (2), the refund winding of coin relay 63, conductor 69, and HT2. A survey of the above operations from the point of view of a customer will make it quite apparent that the operations required of the customer are identical with those necessary in present day telephone systems.

When a multi-unit call is placed by a customer, the operations required of the central office are identical to those required when it becomes necessary to handle an overtime call. To recapitulate, when the dialed directory number indicates that a multi-unit call is to be placed, the central office transmits a single pulse to the pay station. This pulse finds the deposit control circuit to consist of conductor 68, HT1 and SH2 in parallel, resistor 60, transistor base 70, transistor emitter 71, and conductor 69. The pulse, when amplified, operates program relay 49 causing shorting conductor 53 to close contacts (1). Source 62 is thereby connected to a circuit comprising contacts (1), contacts 25, deposit signal relay 33, off-normal relay 66, tip conductor 69, and HT2 and SH3 in parallel. As hereinbefore discussed, deposit signal relay 33 will, as a result of energization, step the coin totalizer mechanism back to a no-deposit position and while so doing cause a plurality of break pulses the number of which is representative of the amount deposited, to be sent to the central office. It is assumed, of course, that the customer has followed instructions concerning the placement of such a call, which require him to deposit the full amount prior to dialing. Upon reception of the deposit appraisal signals, the central office will determine whether the amount is sufficient to warrant connection of the parties. Finding it so, such connection will be made and the call will then proceed in the normal fashion. Upon expiration of the allotted time for this call, two pulses will be transmitted from the central office which in accordance with the aforementioned procedure, will cause conductor 53 to close contacts (3), connecting source 62 to coin relay 63 in such a manner as to collect all deposited coins. No additional comment is required as to the operations necessitated by hang up of handset 58 in the case of multi-unit calls inasmuch as the operations performed upon such hang up are identical to those mentioned above.

A toll call is performed in a manner similar to that used in handling multi-unit calls, the only differences arising from the fact that the customer is generally unaware of the exact amount of money required for the call and the fact that there is no automatic equipment available to complete the connection and therefore an operator is required. Once the operator has ascertained the amount of deposit required to make the desired call, this information is transmitted to the customer who in turn will make the deposit. In order to determine how much deposit is made, the operator, immediately upon determination of the necessary amount, will cause one pulse to be transmitted to the pay station. This causes the deposit signal relay 33 to be connected into the deposit appraisal circuit as has been discussed above. As deposits are made, the appropriate number of break pulses will be transmitted to the central office to indicate the denomination of such deposits. All of the subsequent operations for the call will be similar to the operations already considered with respect to local and multi-unit calls.

The circuit schematic of Fig. 5 will reveal, upon analysis, a utilization of the coin totalizer of Fig. 1, deposit signal relay 33, off-normal relay 66, and coin relay 63 which is analogous to their use in Fig. 4. The basic difference between these two embodiments of the present invention lies in the means of controlling the deposit operations. In place of the program relay and selecting mechanism of Fig. 2, Fig. 5 utilizes a plurality of detection circuits, each of which gates on a transistor circuit which in turn controls the operation of a relay. Contacts controlled by each of these relays are so arranged as to connect a local supply to either the coin control relay or the deposit signal relay, dependent upon which pair of detection circuits receive a signal.

More specifically, deposit control signals are transmitted from the central office in the form of a pair of frequencies. This pair of frequencies determines the particular one of the three different operations capable of being performed by the deposit control circuit that will be performed. Three separate frequency sources are available at the central office. These frequencies may be generated in any well-known fashion and are depicted in block diagram form in Fig. 5 as being located at central office 106. Each pay station has three detection circuits, depicted in Fig. 5 as TC1, TC2, and TC3, each designed to detect a specific one of these frequencies and to produce an output when such a frequency is detected. These detection circuits may be constructed in any well-known fashion. For example, they may consist of an inductance and capacitance circuit designed to be in resonance at the frequency to be detected.

An example may best illustrate the operation of this deposit control circuitry. It will be assumed that the three frequencies to be used are $f1$, $f2$, and $f3$. For deposit control, any two of these frequencies are mixed at the central office; for instance, $f1$ and $f2$, and they are then transmitted over the line to the pay station. The resulting composite signal, upon reception at the pay station, is applied to the base 74 of transistor 73 via capacitor 81 and resistors 82 and 83, the function of the resistors being merely to provide a suitable input for the transistor amplifier circuit. These frequencies, having been amplified, appear at collector 76, pass through capacitor 77, are rejected by TC3, are permitted to go through tuned circuits TC1 and TC2 respectively, and are applied to the bases 78 and 79 of transistors 84 and 85 respectively which are biased to cutoff. When a sufficiently high level of tone signal is applied between the base and the emitter of each of transistors 84 and 85, they are driven to class B operation and the current flows in their collector circuits 87 and 88 causing relays 90 and 91 respectively to operate. Examination of the circuitry will indicate that transistors 84 and 85 receive their direct-current supply from local source 93 whenever hopper trigger contact HT3 is closed. Operation of relays 90 and 91, as a result of the reception by the pay station of frequencies $f1$ and $f2$, causes the establishment of a circuit connecting local battery 93 to the coin relay in a manner to collect the deposited coins. The circuitry over which this voltage is applied comprises hopper trigger contact HT3, contact 101, contacts 93, contacts 95, and collect winding of coin relay 63.

Had frequencies $f2$ and $f3$ been transmitted from the central office, they would have been detected by detection circuits TC2 and TC3, processed by transistors 85 and 86, and caused the operation of relays 91 and 92. The subsequent contact closures would have connected coin relay 63 in a manner to refund the deposited coins, the particular circuit comprising hopper trigger contacts HT3, contacts 100, contacts 97, contacts 94, refund winding of coin control relay 63, and battery 93. By tracing the circuitry in similar fashion, it may be seen that detection of frequencies $f1$ and $f3$ in the signal transmitted from the central office would result in the operation of relays 90 and 92 and the subsequent contact closures would find a circuit comprising battery 93 connected through hopper trigger contacts HT3, contacts 96, 99, 102, 25 deposit signal relay 33, off normal relay 66, and conductor 69.

An important feature of the deposit control circuit illustrated in Fig. 5 is its ability to differentiate between the signals transmitted from the central office not only with respect to frequency but with respect to the number of frequency components present. Each of the three relays controlled by the signals must be in a definite condition for each operation. Should any one of them be operated when non-operation is expected for the proper control operation, or vice versa, the operation will not be performed. For instance, as discussed previously, in order to collect deposits, frequencies $f1$ and $f2$ must be present in the signal; if $f3$ also appears the collection circuit will be opened due to operation of contacts 101 and thus no collection will result. In this way, imitation of the deposit control signals by fraudulent parties is further impeded.

It is apparent that the three deposit control operations initiated in the circuit of Fig. 4 by means of program relay 49 and selector shorting conductor 53 in response to a series of pulses, are initiated in Fig. 5 by circuitry responsive to particular pairs of frequencies selected from a predetermined three frequencies. It is only in this respect that the circuit of Fig. 5 differs from the circuit of Fig. 4 and for this reason, the particular steps in the operation of the circuit elements for either local, multiunit, or toll calls will not be reiterated. It need merely be borne in mind that only the type of signals transmitted, and the enabling means employed for the particular operation, varies. The operations themselves, in response to these signals, are identical.

The above-detailed description is merely an illustration of several embodiments of the present invention and it is not intended to limit the invention to these illustrative embodiments. Considering the illustrative embodiment of Fig. 5, for example, other detection means may be employed, and other alternating-current signals used, to initiate the desired deposit control operations without departing from the spirit, scope, or teachings of this invention.

What is claimed is:

1. A coin collector circuit comprising in combination, coin disposal means operative to collect or refund deposited coins in response to an applied potential, deposit appraisal means operable in response to an applied potential, a source of potential, and means responsive to signals from said central office for selectively connecting said source of potential to said coin disposal means or said deposit appraisal means.

2. A telephone pay station connected to a central office comprising in combination, totalizing means operable in response to the deposit of coins for registering the total amount of deposit, resetting means for said totalizing means, coin disposal means operable to either collect or refund deposited coins, selecting means controlled by signals from said central office for operating said resetting means and said coin disposal means, and deposit signaling means operative in response to the operation of said resetting means.

3. A telephone pay station as defined in claim 2 wherein said selecting means comprises, an amplifier for said signals from said central office, enabling means for said amplifier, a relay controlled by said amplifier and operable upon reception of said signals from said central office, a potential source, and means responsive to the operation of said relay for connecting said potential source to said resetting means and said coin disposal means.

4. A telephone pay station as defined in claim 2 wherein said selecting means comprises, a plurality of tuned circuits for detecting predetermined frequencies in said signals transmitted from said central office, pulse generating means controlled by each of said tuned circuits for producing a pulse whenever the associated tuned circuit yields an output, a plurality of relays controlled by said pulses, and circuit means operable when a predetermined number of said relays operate to control operation of said resetting means and said coin disposal means.

5. A telephone pay station connected to a central office comprising in combination, totalizing means operable in response to the deposit of coins for registering the total amount of deposit, relay means operable in response to an applied potential for resetting said totalizing means, coin disposal means operable to collect or refund deposited coins in response to an applied potential, a source of potential, deposit control means operable in response to signals from said central office to connect said source of potential to said relay means or said coin disposal means, and deposit signaling means controlled by said totalizing means and operative in response to operation of said relay means.

6. A telephone pay station as defined in claim 5 wherein said deposit control means comprises means responsive to pulsed signals for selectively connecting said source of potential to said relay means or said coin disposal means in accordance with a predetermined code arrangement based upon the number of pulses present in each said signal.

7. A telephone pay station as defined in claim 5 wherein said deposit control means is responsive to alternating-current signals and comprises translating means for interpreting said alternating-current signals, and connecting means activated by said translating means for selectively connecting said source of potential to said relay means or said coin disposal means.

8. In a telephone pay station a deposit control circuit comprising in combination, totalizing means operable in response to the deposit of coins for registering the total deposit, resetting means operable in response to an applied potential for resetting said totalizing means, coin disposal means operable to collect or refund deposited coins in response to an applied potential, a source of potential, contact means for applying said source of potential to said coin disposal means and for applying said source of potential to said resetting means, means responsive to signals from said central office for controlling said contact means, and deposit signaling means controlled by said totalizing means and operative in response to the operation of said resetting means.

9. In a telephone pay station connected by a line loop to a central office, a deposit control circuit comprising in combination, a source of potential, totalizing means actuated by the deposit of coins for registering the total amount of deposit, relay means operable when said totalizing means is actuated for resetting said totalizing means in discrete steps, each of said steps representative of a predetermined unit of the total amount of deposit, coin disposal means operable to collect or refund deposited coins in response to an applied potential, means operable in response to signals from said central office for applying said source of potential to said coin disposal means or said relay means, and signaling means controlled by said relay means for applying a direct-current potential condition to said line loop for each said discrete step made by said totalizing means when reset.

10. In a telephone pay station connected by a line loop to a central office, a deposit control circuit comprising in combination, a source of potential, totalizing means actuated by the deposit of coins for registering the total amount of deposit, self-stepping relay means operable upon application of a potential when said totalizing means is actuated for resetting said totalizing means in discrete steps, each of said steps representative of a predetermined unit of said total amount of deposit, signal means controlled by said self-stepping relay means for creating an open condition of predetermined duration in said line loop for each said discrete step made by said totalizing means when reset, coin disposal means operable to collect or refund deposited coins in response to an applied potential, decoding means for decoding control signals from said central office, and contact means controlled by said decoding means for selectively applying said source of potential to said coin disposal means or to said self-stepping relay means.

11. A telephone pay station as defined in claim 10 wherein said decoding means is responsive to current pulses and comprises in combination, pulse amplifying means producing an output for each said current pulse received and current controlled means energized by said output for selectively operating said contact means in accordance with the number of said pulses received.

12. A telephone pay station as defined in claim 10 wherein said decoding means is responsive to particular frequencies transmitted in signals from said central office and comprises in combination, amplifying means for said signals from said central office, a plurality of frequency responsive means each activated by a distinct one of said particular frequencies, and individual relay means for each of said particular frequencies controlled by said frequency responsive means, said relay means controlling said contact means.

13. A telephone pay station as defined in claim 10 wherein said contact means comprises, three distinct groups of contacts, each group individually controlled by a relay and pairs of contacts of each said groups being serially connected to pairs of contacts of all other groups providing a distinct series path upon simultaneous operation of any two of said relays.

14. A telephone pay station having customer operated transmitting and receiving elements and connected by a line loop to a central office, comprising in combination, a source of potential, totalizing means actuated by the deposit of coins for registering the total amount of deposit, self-stepping relay means operable upon application of a potential when said totalizing means is actuated for resetting said totalizing means in discrete steps, each of said steps representative of a predetermined unit of said total amount of deposit, signal means controlled by said self-stepping relay means for creating an open condition of predetermined duration in said line loop for each said discrete step made by said totalizing means when reset, coin disposal means having a refund winding and a collect winding, selecting means responsive to signals from said central office for selectively applying said source of potential to said self-stepping relay means, to said collect winding, or to said refund winding, means operable during operation of said self-stepping relay means for disabling said transmitting and receiving elements, and contact means operated simultaneously with the operation of said coin disposal means for disconnecting said transmitting and receiving elements during each such operation.

15. A telephone pay station as defined in claim 14 wherein said selecting means is responsive to direct-current pulses from said central office and comprises in combination, a first pair of contacts connectable to apply said source of potential to said collect winding of said coin disposal means, a second pair of contacts connectable to apply said source of potential to said refund winding of said coin disposal means, a third pair of contacts connectable to apply said source of potential to said self-stepping relay means, amplifying means energized by said source of potential for amplifying said pulses, and means controlled by the output of said amplifying means for selectively connecting said pairs of contacts in accordance with the number of pulses received.

16. A telephone pay station as defined in claim 14 wherein said selecting means is responsive to particular frequencies transmitted in signals from said central office and comprises in combination, amplifying means for said particular frequencies, detection circuitry associated with said amplifying means for detecting said particular frequencies in said signals, a separate pulse generator for each of said particular frequencies controlled by said detection circuitry and operable when each said particular frequency is detected, individual current actuated relay means controlled by each said pulse generator, a plurality of contacts interconnected to provide three complete circuits when said relays are operated two at a time, the first of said circuits connecting said source of potential to said collect winding of said coin disposal means, the second of said circuits connecting said source of potential to said refund winding of said coin disposal means, and the third of said circuits connecting said source of potential to said self-stepping relay means.

No references cited.